Jan. 8, 1963    A. W. HARDY    3,071,915
FILTER
Filed Sept. 26, 1960
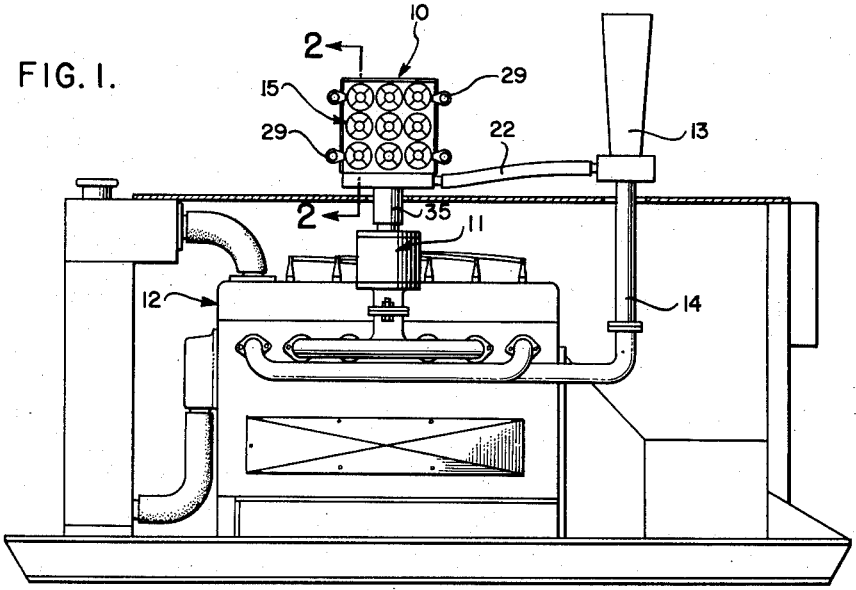
FIG. 1.
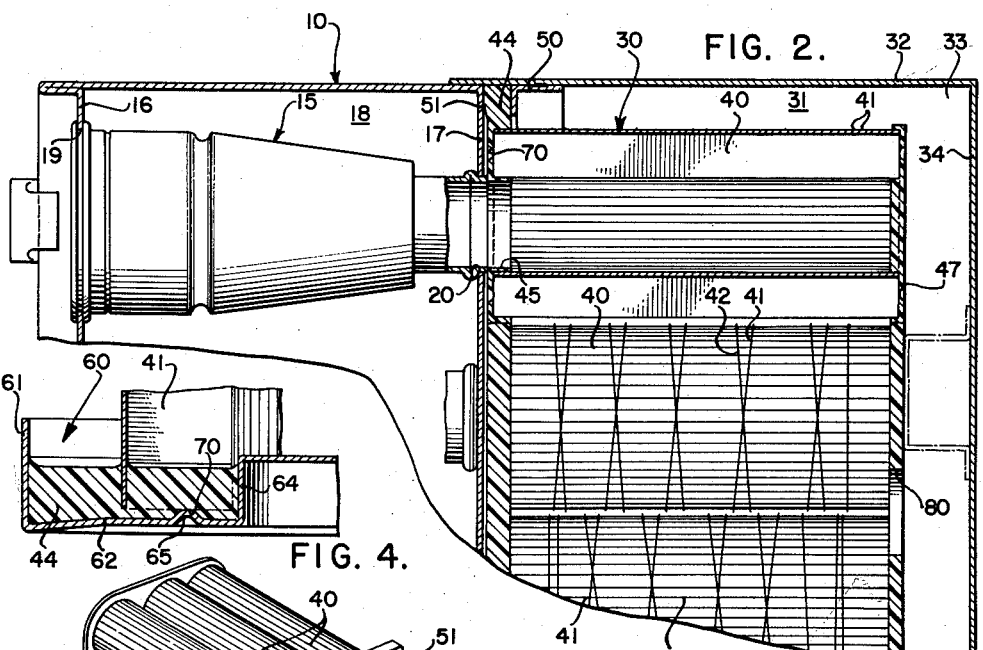
FIG. 2.
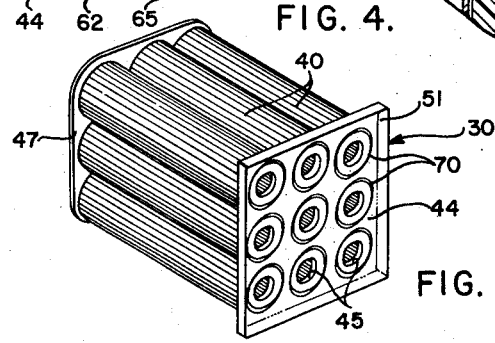
FIG. 4.
FIG. 3.
*INVENTOR.*
ALLEN W. HARDY
BY
Lyon & Lyon
ATTORNEYS

3,071,915
FILTER
Allen W. Hardy, Ogden, Utah, assignor to Farr Company, El Segundo, Calif., a corporation of California
Filed Sept. 26, 1960, Ser. No. 58,347
5 Claims. (Cl. 55—324)

This application relates to filtering apparatus and has particular reference to a multiple tube paper filter adapted to separate fine microscopic particles of either solids or liquids from a flowing stream of air or other gas.

Throughout the following description, the term "air" is used to refer to the gas which is to be filtered and the term "particle" is employed to refer to the impurities which are separated or filtered from the gas. It is understood that the term "air" is employed for convenience and that the filter of the present invention will operate equally well upon other gaseous fluids. The term "particle" is to be understood as including both solid particles and liquid droplets.

A primary object of the present invention is to provide a novel and highly efficient form of air filter of the pleated paper, tubular type.

A further object of the present invention is to provide a novel air filter cartridge comprising a plurality of tubular paper filter elements arranged in parallel, the cartridge being capable of use alone as an air filter, but being particularly adapted to be utilized in combination with an air filter of the cyclonic type.

Cyclonic type air filters are becoming increasingly more popular in applications for internal combustion and diesel engines. However, any cyclone type device used to separate particulate matter from the carrying airstream operates at something less than 100% efficiency, and, depending upon the diameter and height of the cyclone, the size of the particles removed will vary considerably. The copending application of Farr et al., Serial No. 587,325, filed May 25, 1956, now Patent 3,030,755 granted April 24, 1962 discloses a highly effective cyclonic air filter which, because of its small cyclone diameter and reverse flow characteristic, attains the high airstream velocities necessary for efficient separation of fine particles in the range of 5 microns and above under normal conditions. However, many applications require that the equipment operate in environments containing excessively high concentrations of extremely small dust and other particles so that even at high efficiencies, the amount of foreign particulate matter entering the engine is injurious to the life of the engine. Efforts have heretofore been made to solve this problem, as by combining two or more cyclonic or other type air filters in series, or by various combinations of different types of filters. Possibly the best approach heretofore suggested was the use of a cyclone separator as a first stage and a paper or cloth filter as the second stage. However, such proposals have not been entirely successful, due in part at least, to the loss of pressure energy by turbulence and resistance to air flow in the transition from the first stage into the second stage, and in the second stage itself.

A further object of the present invention is, therefore, to provide an air filter which overcomes the above and other disadvantages of those heretofore proposed.

Other objects and advantages of this invention it is believed will be readily apparent from the following detailed description of a preferred embodiment thereof when read in connection with the accompanying drawings.

In the drawings:

FIGURE 1 is a side view of an engine incorporating the air filter of the present invention.

FIGURE 2 is an enlarged sectional view taken substantially on the line 2—2 of FIGURE 1.

FIGURE 3 is a perspective view of the air filter cartridge of the present invention.

FIGURE 4 is a fragmentary vertical section illustrating the method by which the plastic end flange of the cartridge is molded onto the tubular filter elements.

Referring now to the drawings, the air filter assembly 10 is shown attached to, and in communication with the carburetor 11 of an internal combustion engine 12 having an exhaust pipe 14 and an exhaust aspirator 13.

The first stage of the filter assembly 10 is preferably a cyclonic filter of the type disclosed in said copending Farr et al. application, and comprising a plurality of filter units 15 mounted in and extending between the front wall 16 and rear wall 17 of a chamber 18. The inlet ends of the filter units are each mounted within an inlet opening 19 in front wall 16 and the rear or discharge ends of the filter units are each received in an outlet opening 20 in rear wall 17, each opening 20 being in axial alignment with the respective opening 19. The actual number of filter units is determined by the rate at which filtered air is required in the particular application, nine units being shown in the drawings only for convenience. With the exception of inlet openings 19 and outlet openings 20, chamber 18 is closed, except for a bleed-off connection 22 which is operably connected to the exhaust aspirator 13 for continuously withdrawing the separated particles from the filter units and a controlled amount of air from the interior of the chamber 18.

The second stage of the filter assembly 10 comprises the filter cartridge 30 mounted in the chamber 31, the front wall of which is formed by the rear wall 17 of the chamber 18. The two stages are secured together by means of suitable releasable clamp elements 29. The chamber 31 is completely closed, having walls including top wall 32, side walls 33 and rear wall 34, except for the outlet openings 20 (which form inlet openings to the chamber 31) and except for the outlet connection 35 leading from the bottom of the chamber 31 to the air intake of the carburetor 11.

The filter cartridge 30 is made up of a plurality of pleated paper filter elements 40 in tubular form, the inside diameter of each element being substantially equal to that of the openings 20. Each of the filter elements is reinforced by a string 41 wrapped around the cylindrical configuration formed by the outer folds 42 of the individual pleats. The individual filter elements are connected together in the desired spaced configuration at the forward or upstream ends by means of a sealing flange 44 of a relatively soft, flexible plastic or rubber-like material, the flange having inlet openings 45 axially aligned with the interior of each of the filter elements. The rear ends of the filter elements are closed and connected together by means of an end wall 47 of the same plastic material.

Means are provided for removably securing the cartridge in the chamber 31 and, as shown, these means may include a plurality of angle members 50 welded to the inside of the chamber walls. The flange 44 is provided with a peripheral bead 51 which is clamped between the angle members and the rear face of the wall 17. For most installations, this is sufficient to maintain the cartridge in place, but if desired for protection against accidental rearward displacement of the cartridge a channel member, indicated by the phantom lines of FIGURE 2, may be secured to the rear wall 34 in position to contact the rear face of the end wall 47. When in the assembled position shown in FIGURE 2 it will be seen that the filter element 40 is axially aligned with a corresponding filter unit 15.

The method of production of the cartridge is shown in FIGURE 4. Thus, the filter elements 40 are molded into the sealing flange 44 utilizing a mold 60 comprising a rectangular vessel 61 having a bottom 62 shaped to conform to the shape of the end face of the flange. A plurality of raised cylindrical portions 64 are formed in the bottom 62, one for each filter element and spaced apart on centers corresponding to the desired spacing of the filter elements in the completed cartridge. The diameter of the cylindrical portions 64 is slightly less than the inner diameter of the filter elements. The mold configuration is completed by annular beads 65 formed in the bottom, one surrounding and coaxial with each of the portions 64, the diameter of each bead being approximately three-quarters of the outside diameter of the filter elements.

In use of the mold, the required number of filter elements are positioned in the mold 60 over the cylindrical portions 64 and immersed in a solution or dispersion of the plastic material, such as an organisol or plastisol, which forms the flange 44. It will be seen from an inspection of FIGURE 4 that the beads 65 function to maintain the filter elements out of contact with the flat surface of the bottom 62 so that a relatively thick area of the flange material is provided at the annular ends of the filter elements. It will also be understood that the annular grooves 70 in the flange are formed by the beads 65.

The mold for the production of the end wall 47 is the same as that described above, except that the cylindrical portions similar to the portions 64 are utilized to form openings 80 in the end wall, and the overall dimensions of such mold are less than the mold 60. The openings 80 permit air to flow through the end wall 47 after the air has been discharged from the filter elements 40, as will be described more fully below.

In operation of the filter assembly, the negative pressure in the carburetor intake causes outside air to be drawn through the filter units 15 wherein the air is filtered as is fully described in said Farr et al. copending application. The filtered air discharges from the units 15 into the respective filter elements 40 and passes radially outwardly therethrough into the chamber 31, filtering out any residual particles not removed in the first stage. The filtered air then passes into the carburetor through the connection 35.

The assembly thus described operates with a high degree of efficiency in heavily dust-laden air and is thus particularly effective for use in mining and earth moving equipment. The provision of a plurality of paper filter elements rather than a single, large diameter second stage paper air cleaner, and the discharging of the air from the first stage filter units directly into the filter tube elements, minimizes energy losses due to turbulence, the energy of the velocity of the flowing air being converted into sufficient pressure energy to maintain the airflow through the clean paper elements without any pressure drop additional to that occurring in the first stage. The plurality of small paper filter elements is also advantageous over the use of a single paper filter in the utilization of greater overall filter area and the elimination of energy losses caused by the usual reinforcing means such as perforated sheet metal, wire screens and the like. The plastic flange and end wall structure provides an economical means for assembly of the filter elements with sufficient strength to eliminate the necessity for such reinforcement and provides a sealing medium at the tube ends resistant to vibration and other mechanical stresses.

The particular structure of the cartridge 30 has another advantage in that the dirt removed from the airstream is retained within the individual filter elements. Placing the sealing flange on the upstream face of the cartridge allows its removal from the container complete with its dirt inside and so prevents the dumping of accumulated dirt into some passage or housing from which it could easily get into the engine it is supposed to protect. Some paper filter elements are made open at both ends and catch the diret on the outside, the seal being effected by means of a gasket and thumb screws. Such a filter, if not carefully removed, will dump some of its dirt into the clean air side of the induction system, which is obviously an undesirable feature. Even though the paper element be built so that one end is permanently and effectively closed, if it has the airflow from the outside in, this same criticism can be levelled at it. A large diameter filter having the airflow from the inside out presents a greater opportunity for dirt to be dumped out of the inside because of the large opening in the end. The relatively small diameter tubes of this invention make it much easier to retain the collected dirt until the cartridge is removed from the vicinity of the air induction system.

Having fully described my invention, it is to be understood that I do not wish to be limited to the details set forth, but my invention is of the full scope of the appended claims.

I claim:

1. A filter assembly comprising the combination of: a first stage filter comprising a plurality of cyclone filter units; a second stage filter comprising a plurality of tubular pleated filter elements, a sealing flange connecting said elements together at one end, said flange being formed of a rubber-like material and having a plurality of openings therein aligned with the interior of said tubular elements, and an end wall connecting said elements together at the other end, said end wall closing the ends of said elements; and each of said cyclone filter units being axially aligned with one of said openings and associated tubular element with the discharge of each unit connected to the aligned opening.

2. The assembly of claim 1 including a housing and wherein the sealing flange is connected to said housing in sealing relationship therewith.

3. A filter assembly comprising the combination of: a first stage filter comprising a plurality of cyclone filter units; a second stage filter comprising a plurality of tubular pleated filter elements, a sealing flange connecting said elements together at one end, said flange being formed of a rubber-like material and having a plurality of openings therein aligned with the interior of said tubular elements, said one end of said elements being embedded in said flange, and an end wall connecting said elements together at the other end, said end wall closing the ends of said elements, said wall being of the same material as said flange and said other end of said elements being embedded in said end wall; and each of said cyclone filter units being axially aligned with one of said openings and associated tubular element with the discharge of each unit connected to the aligned opening.

4. A filter assembly comprising the combination of: a housing having a partition wall dividing the housing into first and second chambers, a plurality of inlet apertures in said housing communicating with said first chamber, a like plurality of openings in said partition wall, each of said openings being axially aligned with one of said inlet apertures, a like plurality of cyclone filter units positioned in said first chamber, each cyclone filter unit extending from one of said inlet apertures to the said aligned opening, each cyclone filter unit having the inlet associated with said inlet aperture and the discharge associated with said opening, a like plurality of tubular pleated filter elements positioned in said second chamber, a sealing flange connecting said elements together at one end, said flange having a plurality of openings therein aligned with the interior of said tubular elements, said flange openings aligned with said partition wall openings in sealing relationship, and an end wall connecting said elements at the other end and closing the ends of said elements; and each of said tubular elements being in axial alignment with one of said cyclone filter units, one of said inlet apertures, and one of said partition wall openings for minimizing the loss of air pressure from said inlet apertures through said cyclone unit and filter element to said second chamber.

5. A filter assembly comprising the combination of: a housing having a partition wall dividing the housing into first and second chambers, a plurality of inlet apertures in said housing communicating with said first chamber, a like plurality of openings in said partition wall, each of said openings being axially aligned with one of inlet apertures, a like plurality of cyclone filter units positioned in said first chamber, each cyclone filter unit extending from one of said inlet apertures to the said aligned opening, each cyclone filter unit having the inlet associated with said inlet aperture and the discharge associated with said opening, a bleed-off opening to said first chamber for maintaining a reduced pressure in the first chamber and removing dust particles separated by said cyclone filter units, a like plurality of tubular pleated filter elements positioned in said second chamber, a sealing flange connecting said elements together at one end, said flange having a plurality of openings therein aligned with the interior of said tubular elements, said flange openings aligned with said partition wall opening in sealing relationship, an end wall connecting said elements at the other end and closing the ends of said elements, and an outlet from said second chamber for withdrawing the filtered air; and each of said tubular elements being axially aligned with one of said cyclone filter units, one of said inlet apertures, and one of said partition wall openings for minimizing the loss of air pressure from said inlet apertures to the said outlet from said second chamber.

References Cited in the file of this patent

UNITED STATES PATENTS

| | | |
|---|---|---|
| 1,714,854 | Dollinger | May 28, 1929 |
| 2,122,111 | Poelman et al. | June 28, 1938 |
| 2,732,031 | Rabbitt et al. | Jan. 24, 1956 |
| 2,745,513 | Massey | May 15, 1956 |
| 2,836,256 | Caskey | May 27, 1958 |
| 2,941,620 | Thornburgh | June 21, 1960 |

FOREIGN PATENTS

| | | |
|---|---|---|
| 326,047 | Great Britain | Mar. 6, 1930 |
| 683,132 | Germany | Oct. 31, 1939 |
| 874,986 | France | June 1, 1942 |
| 700,297 | Great Britain | Nov. 25, 1953 |
| 761,710 | Great Britain | Nov. 21, 1956 |